United States Patent
Jouhikainen et al.

(10) Patent No.: US 10,488,940 B2
(45) Date of Patent: Nov. 26, 2019

(54) INPUT COMMANDS VIA VISUAL CUES

(71) Applicant: Capital One Services, LLC, McLean, VA (US)

(72) Inventors: Hannes Jouhikainen, McLean, VA (US); Timur Sherif, Washington, DC (US); Steve Blanchet, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/916,809

(22) Filed: Mar. 9, 2018

(65) Prior Publication Data

US 2019/0278377 A1    Sep. 12, 2019

(51) Int. Cl.
| | |
|---|---|
| G06F 3/01 | (2006.01) |
| G06F 3/048 | (2013.01) |
| G06F 3/0487 | (2013.01) |
| G06F 3/0488 | (2013.01) |
| G06K 9/00 | (2006.01) |
| H04N 21/44 | (2011.01) |
| G06Q 40/00 | (2012.01) |

(52) U.S. Cl.
CPC .............. *G06F 3/017* (2013.01); *G06F 3/048* (2013.01); *G06K 9/00221* (2013.01); *G06K 9/00335* (2013.01); *G06Q 40/125* (2013.12); *H04N 21/44008* (2013.01); *G06F 3/0487* (2013.01); *G06F 3/0488* (2013.01); *G06F 3/04883* (2013.01); *G06K 9/00355* (2013.01)

(58) Field of Classification Search
CPC .. G06F 3/0488; G06F 3/04883; G06F 3/0487; G06F 3/017; G06F 3/048; G06K 9/00355; G06K 9/00335; G06K 9/00221; G06Q 40/125; H04N 21/44008

See application file for complete search history.

(56) References Cited

U.S. PATENT DOCUMENTS

| | | | |
|---|---|---|---|
| 6,421,453 B1 | 7/2002 | Kanevsky et al. | |
| 7,376,913 B1* | 5/2008 | Fleck | G06F 3/0362 715/808 |
| 9,330,093 B1* | 5/2016 | Chang | G06F 16/00 |
| 2006/0026521 A1* | 2/2006 | Hotelling | G06F 3/0418 715/702 |
| 2006/0028429 A1* | 2/2006 | Kanevsky | G06F 3/011 345/156 |
| 2012/0249741 A1* | 10/2012 | Maciocci | G06F 3/011 348/46 |
| 2013/0159939 A1 | 6/2013 | Krishnamurthi | |
| 2014/0164476 A1* | 6/2014 | Thomson | G06Q 10/101 709/203 |
| 2016/0014465 A1* | 1/2016 | Baskaran | H04N 21/482 725/38 |

* cited by examiner

*Primary Examiner* — Ting Z Lee
(74) *Attorney, Agent, or Firm* — DLA Piper LLP (US)

(57) ABSTRACT

Embodiments disclosed herein generally relate to a method and system of generating text input via facial recognition. A computing system receives a video stream of a user operating an application on a client device. The video stream includes a time series of images of the user. The computing system parses the video stream to identify one or more visual cues of the user. The computing system identifies a current page of the application. The computing system maps the identified on or more visual cues to an operation available on the current page of the application. The computing system executes the mapped operation.

20 Claims, 8 Drawing Sheets

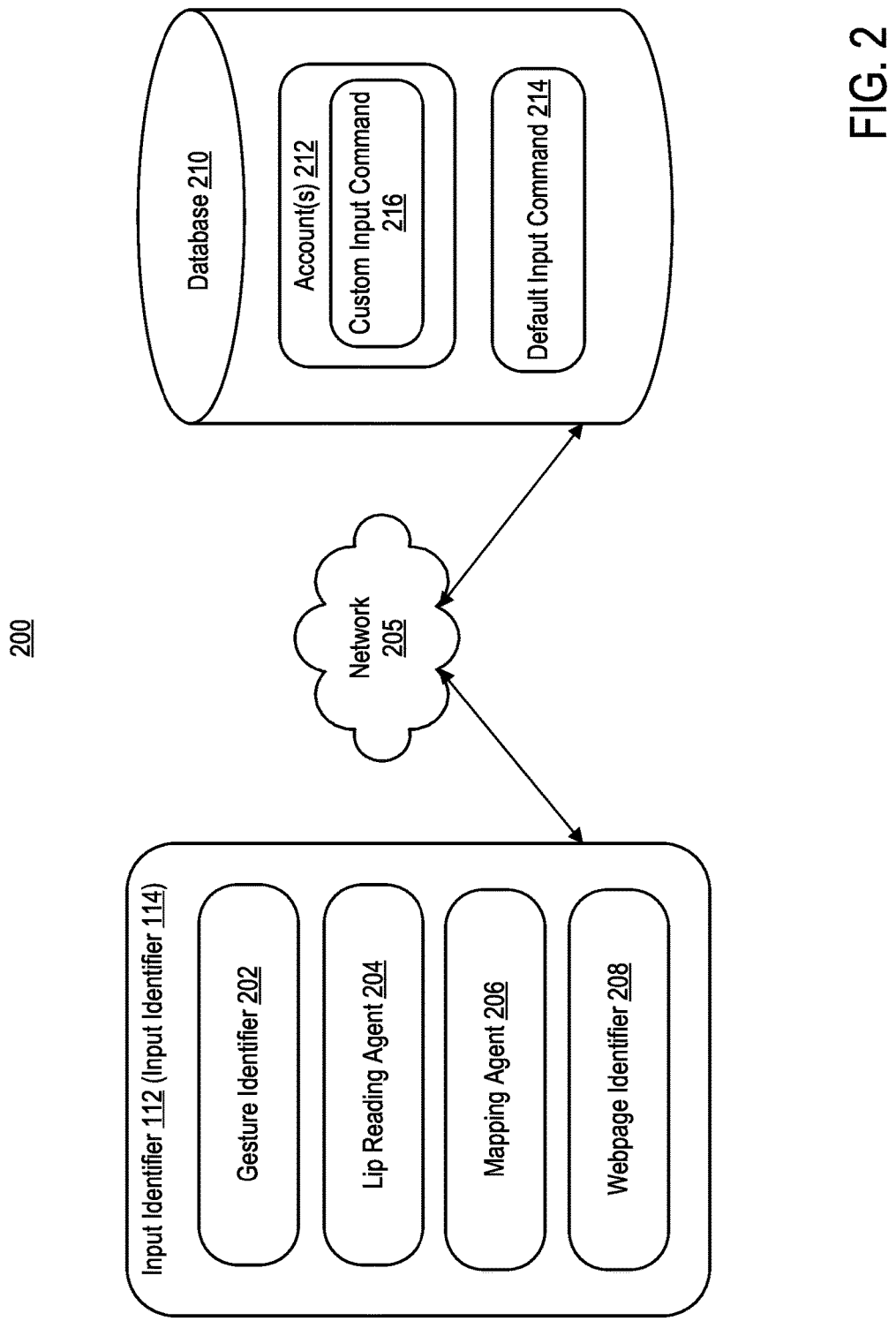

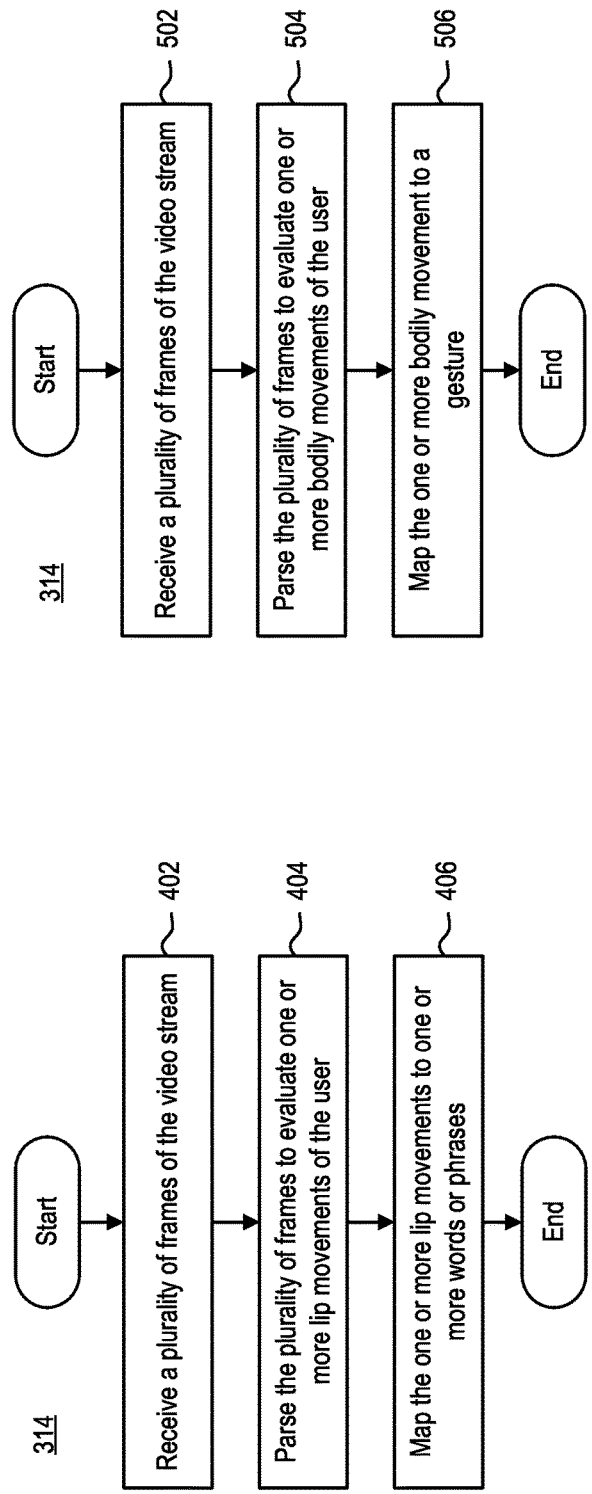

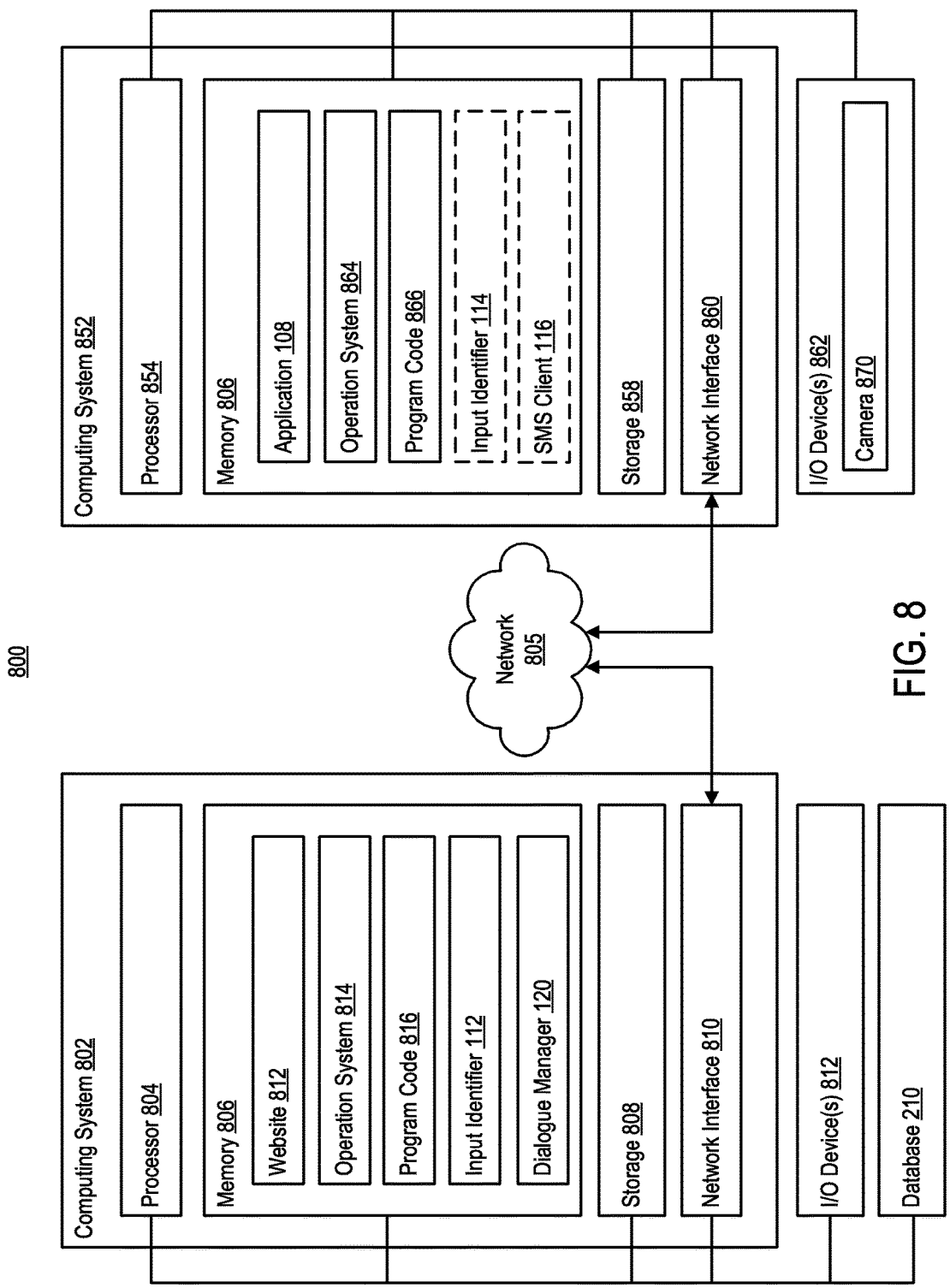

INPUT COMMANDS VIA VISUAL CUES

BACKGROUND

The present disclosure generally relates to a method and a system for determining an input command based on one or more visual cues of a user.

An example application of the present disclosure is for improving accessibility to functionality of a financial application on a mobile or desktop experience. Consumers increasingly demand remote access to financial service accounts and other banking information. Remote banking technology has advanced to the point that few transactions need to be conducted in a brick and mortar bank branch. Increasing the array of remote or mobile banking options provides convenience to the consumer, and then to the bank as well. A user may operate a properly configured mobile computing device (or desktop computing device) to conduct or engage in certain mobile or online banking activities. As the capabilities of mobile computing devices increase, the functionality of online banking applications can increase as well.

SUMMARY

Embodiments disclosed herein generally relate to a method and system for determining an input or an input command based on one or more visual cues of a user. In one embodiment, a method is disclosed herein. A computing system receives a video stream of a user operating an application on a client device. The video stream includes a time series of images of the user. The computing system parses the video stream to identify one or more visual cues of the user. The computing system identifies a current page of the application. The computing system maps the identified one or more visual cues to an operation available on the current page of the application. The computing system executes the mapped operation.

In some embodiments, parsing the video stream to identify one or more visual cues of the client includes the computing system identifying lip movements of the user over the time series of images to identify one or more words mouthed by the user.

In some embodiments, parsing the video stream to identify one or more visual cues of the client includes the computing system determining one or more gestures of the user performed by the user over the time series of images.

In some embodiments, mapping the identified one or more visual cues to an operation available on the current page of the application includes the computing system referencing a database storing predefined visual cues linked to operations of the application.

In some embodiments, the predefined visual cues are user specific.

In some embodiments, the one or more visual cues of the client maps to the operation while accessing the current page of the application, and wherein the one or more visual cues of the client maps to a second operation while accessing a second page of the application.

In some embodiments, mapping the identified one or more visual cues to an operation available on the current page of the application includes the computing system mapping the identified one or more visual cues to an authentication operation that grants the user access to a profile of the user on the application.

In another embodiment, a system is disclosed herein. The system includes a processor and a memory. The processor receives a video stream of a user accessing an application. The memory stores program code, which, when executed by the processor, performs an operation. The operation includes parsing a time series of images in the video stream to identify a command visually communicated by the user. The operation further includes identifying a current page of the application. The operation further includes mapping the visual command of the user to an operation available on the current page of the application. The operation further includes executing the mapped operation.

In some embodiments, the operation of parsing the time series of images in the video stream to identify the command visually communicated by the user includes the operation of identifying one or more visual cues performed by the user.

In some embodiments, the operation of parsing the time series of images in the video stream to identify the command visually communicated by the user includes the operation of determining a lip movement of the user to identify one or more words mouthed by the user.

In some embodiments, the operation of parsing the time series of images in the video stream to identify the command visually communicated by the user includes the operation of determining one or more gestures performed by the user.

In some embodiments, the operation of mapping the identified one or more visual cues to an operation available on the current page of the application includes the operation of referencing a database storing predefined visual cues linked to operations of the application.

In some embodiments, the predefined visual cues are user specific.

In some embodiments, the one or more visual cues of the client maps to the operation while accessing the current page of the application, and the one or more visual cues of the client maps to a second operation while accessing a second page of the application.

In some embodiments, the operation of mapping the identified one or more visual cues to an operation available on the current page of the application includes the operation of mapping the identified one or more visual cues to an authentication operation that grants the user access to a profile of the user on the application.

In some embodiments, the operation is developed from a training data set that was developed using a training algorithm.

In another embodiment, a method is disclosed herein. A client device captures a video stream of a user, while the user is operating an application on the client device. The client device parses the video stream to identify one or more visual cues to identify a command visually communicated by the user. The client device maps the one or more visual cues performed by the user to one or more stored commands. The client devices sends the mapped command to a remote server to identify an operation the one or more stored commands map to on a current page of the application. The client device receives the operation from the remote server. The client device updates an interface of the client device to prompt the user with a text-based description of the operation.

In some embodiments, the client device further determines that the user has rejected the text-based description of the operation and prompts the user to capture a further video stream of the user while operating the application.

In some embodiments, the client device further determines that the user has affirmed the text-based description of the operation and notifying the remote server that the user has affirmed the operation.

In some embodiments, parsing the video stream to identify one or more visual cues to identify a command visually communicated by the user includes identifying one or more lip movements of the user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a block diagram illustrating components of the computing environment of FIG. 1 in more detail, according to one embodiment.

FIG. 4 is a flow diagram illustrating a step of the method of FIG. 3 in more detail, according to one embodiment.

FIG. 5 is a flow diagram illustrating a step of the method of FIG. 3 in more detail, according to one embodiment.

FIG. 8 is a block diagram illustrating a computing environment, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
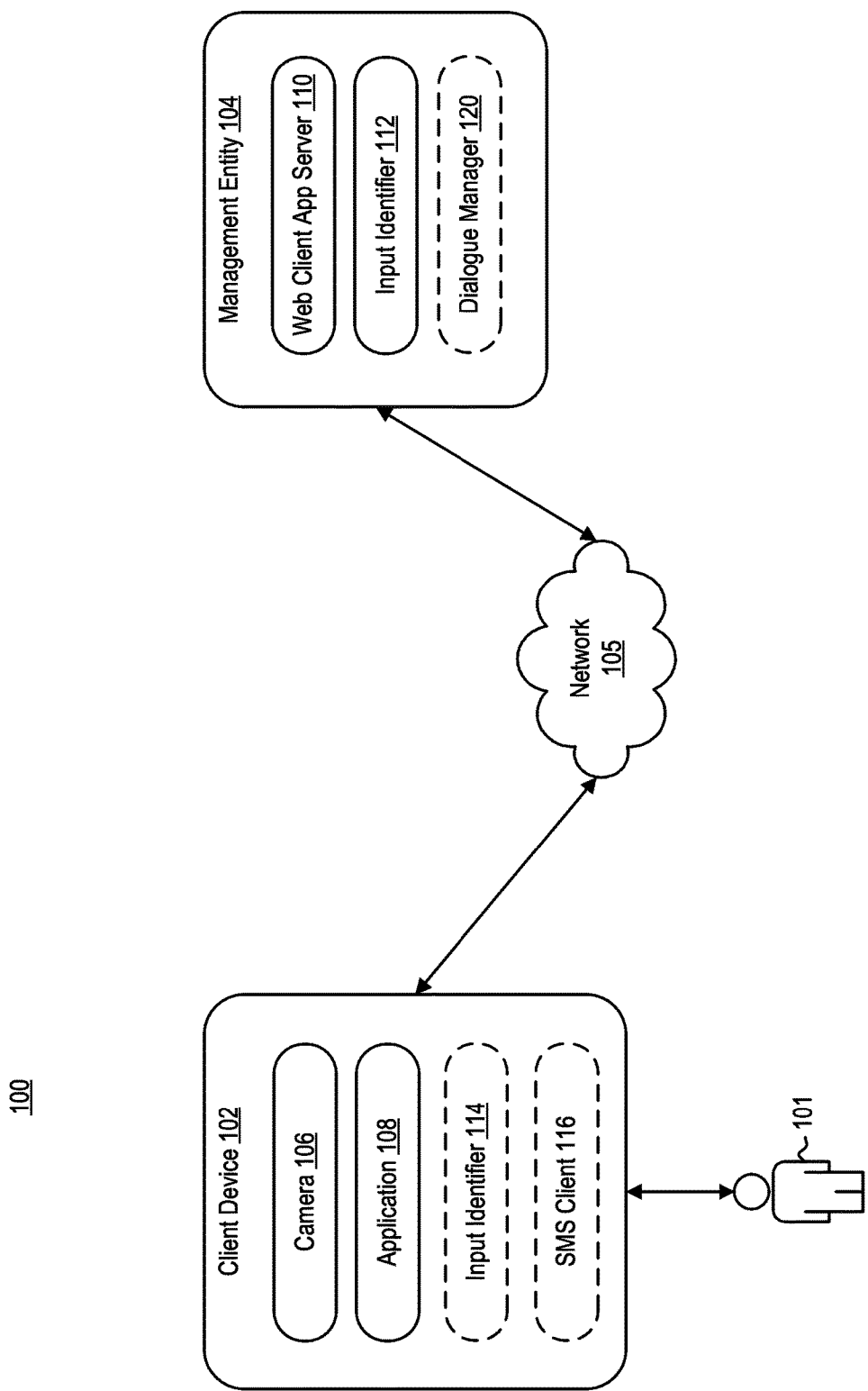
FIG. 1 is a block diagram illustrating a computing environment, according to one embodiment.

The present disclosure generally relates to a method and a system for determining an input or input command based on one or more visual cues of a user. One or more techniques disclosed herein relate to mapping one or more visual cues of a user to one or more inputs to a computing device. The one or more inputs may include commands currently available in a website or an application (e.g., mobile application, desktop application, etc.). For example, applications in a mobile computing device typically require, at the very least, authentication and user input to facilitate one or more operations performed therein. Such processes, however, are not conducive to users that have difficulty entering input commands to text fields in a mobile application. Furthermore, while some applications enable audio speech recognition, such speech recognition functionality is typically provided for transcribing speech to textual input—not for the input of commands. Additionally, in some situations, (e.g. a quiet place or a crowded public place) a user may not feel comfortable speaking audible inputs to a mobile device, particularly if the nature of the input includes sensitive information. Still further, such processes may not be conducive to users that want to streamline the mobile application process.

The systems and methods disclosed herein leverage existing input devices (e.g., camera) of a computing device to capture a real-time (or near real-time) sequence of visual cues performed by a user of the computing device. The sequence of visual cues performed by the user may be mapped to an operation that is currently available on a website, a web application or a mobile application, etc.

In some embodiments, when identifying the operation to which the one or more visual cues map, the method may identify a default input command that is set by a management entity that manages the website, web application, or mobile application. In other embodiments, when identifying the operation to which the one or more visual cues map, the method may identify a custom input command that is set by the user of the computing device, and is stored by a management entity in a user's account or account profile.

In some embodiments, the methods described herein map the one or more visual cues to one or more input commands by identifying a gesture of the user. For example, the methods may track bodily movements of a user to determine the gesture the user is performing. In some embodiments, the methods described herein may read the lips of a user to determine the input or input command the user is attempting to mouth. In both embodiments, the method may verify the mapped input command with a user prior to executing the mapped input command.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

FIG. 1 is a block diagram illustrating a computing environment 100, according to one embodiment. Computing environment 100 includes a client device 102 and a management entity 104 in communication over network 105. Client device 102 may be operated by user 101. For example, client device 102 may be a mobile device, a tablet, a desktop computer, or any computing system having the capabilities described herein.

Client device 102 includes at least a camera 106 and an application 108. Application 108 may be representative of a web browser that allows access to a website or a stand-alone application. User 101 may operate client device 102 to access a functionality of management entity 104 using application 108. In the embodiments described below, user 101 operating client device 102 may communicate over network 105 to request a webpage, for example, from web client application server 110. For example, client device 102 may be configured to execute application 108 to access content managed by web client application server 110. The content that is displayed to the user may be transmitted from web client application server 110 to client device 102, and subsequently processed by application 108 for display through a graphical user interface (GUI) of client device 102.

In some embodiments, client device 102 may further include input identifier 114 and a dialogue management client 116. Input identifier 114 is substantially similar to input identifier 112. In some embodiments, input identifier 114 may obviate the need for input identifier 112. In some embodiments, input identifier 114 may work in conjunction with input identifier 112 to carry out the processes discussed below. SMS client 116 is a messaging service component that allows user 101 to communicate with one or more external parties via text messaging. Input identifier 114 may interface with SMS client 116 to communicate with management entity 104. For example, input identifier may interface with SMS client 116 to communicate with a dialogue management device 120 on management entity 104. In operation, input identifier 114 may identify one or more visual cues performed by the user, transcribe the one or more visual cues into a command, input the command as a text message to SMS client 116, and transmit the command as the text message to dialogue management device 120 on management entity 104 for further processing.

Camera 106 is configured to capture one or more data streams of user 101 while user 101 is accessing application 108 on client device 102. In some embodiments, web client application server 110 may first request user 101 authorization to allow camera functionality to web client application server 110 while user 101 operates application 108. Client device 102 transmits the one or more data streams captured by camera 106 to management entity 104 for processing. In some embodiments, processing of the data streams captured by camera 106 may be performed by client device 102. For example, application 108 may be a system messaging server (SMS) client or interfaces with an SMS client to communicate with management entity 104.

Management entity 104 further includes an input identifier 112. Input identifier 112 is configured to identify one or more visual cues performed by user 101 during operation of application 108. Input identifier 112 may then map the identified one or more visual cues to an input currently available on application 108. In some embodiments, input identifier 112 may generate a message to be transmitted to client device 102 to verify the input to which identifier 112 mapped the one or more visual cues.

Generally, input identifier 112 may be useful in situations where user 101 is unable to generate voice for words, but is able to move their mouth to express that word. In other examples, input identifier 112 may be useful in situations where user 101 is in a noisy environment, and capturing audio data is not feasible. In other examples, input identifier 112 may be useful for users that want to form their own language or expressions, and link certain gestures to certain operations.

In some embodiments, one or more of the elements and functionality of input identifier 112 may contained in and/or be performed by client device 102.

FIG. 2 is a block diagram of a computing environment 200 illustrating components of computing environment 100 in greater detail, according to one embodiment. Computing environment 200 includes input identifier 112 and database 210 communicating over network 205. Input identifier 112 includes a gesture identifier 202, a lip reading agent 204, a mapping agent 206, and a webpage identifier 208. Although FIG. 2 discusses one or more components with respect to input identifier 112, those skilled in the art could readily understand that the one or more components may be components of input identifier 114, or a portion of the one or more components may be components of input identifier 112 and another portion of the one or more components may be components of input identifier 114.

Each of gesture identifier 202, lip reading agent 204, mapping agent 206, and webpage identifier 208 may be one or more software modules. The one or more software modules are collections of signals stored on a media (e.g., memory of management entity 104) that represent a series of machine instructions (e.g., program code) that implements one or more algorithmic steps. Such machine instructions may be the actual computer code the processer of management entity 104 interprets to implement the instructions, or, alternatively, may be a higher level coding of the instructions that is interpreted to obtain the actual computer code. The one or more software modules may also include one or more hardware components. One or more aspects of the algorithm may be performed by the hardware components (e.g., circuitry) itself, rather as a result of an instruction.

Gesture identifier 202 may be configured to identify one or more gestures performed by user 101. For example, gesture identifier 202 may parse one or more data streams to identify one or more gestures performed by user 101. The data streams may include video data and/or sequences of image data. In some embodiments, gesture identifier 202 may track bodily movements of user 101 over a plurality of frames of the one or more data streams. Each of the one or more gestures may correspond to one or more inputs or commands for application 108. In some embodiments, the one or more gestures may correspond to a text input into a text field displayed in application 108. In other embodiments, the one or more gestures may correspond to an operation or command to be performed in application 108. For example, a hand wave gesture may correspond to a logging out operation of user's account.

In some embodiments, gesture identifier 202 may further be configured to track one or more eye movements of user 101. Tracking the one or more eye movements of user 101 while operating application 108 may aid in accurately determining a selection by a user. For example, by tracking one or more eye movements of user 101, gesture identifier 202 may be able to decipher between two possible options available. In another example, gesture identifier 202 may be able to track a pattern of eye movements that is interpreted as a specific command.

Lip reading agent 204 may be configured to identify one or more words mouthed by user 101 based on user's lip movement. For example, lip reading agent 204 may parse one or more data streams to identify one or more lip movements of user 101. In some embodiments, lip reading agent 204 may track lip movements of user 101 over a plurality of frames of the one or more data streams. For example, in each frame of data, lip reading agent 204 may map a location of user's lips over time. Based on the change of location of user's lips, lip reading agent 204 may be able to determine a word (or words) spoken by user 101. Each of the one or more words mouthed by user 101 may correspond to one or more inputs for application 108. In some embodiments, the one or more words may correspond to a text input into a text field displayed in application 108. In other embodiments, the one or more words may correspond to an operation to be performed in application 108. For example, lip movements corresponding to the phrase "check balance" may correspond to a checking balance operation of user's account. In operation, for example, input identifier 114 on client device 102 may map the one or more visual cues to the phrase "check balance." Input identifier 114 may interface with SMS client 116 on client device 102 to generate a message "check balance" to be transmitted to management entity 104. SMS client 116 may transmit "check balance" message to dialogue manager 120 on management entity 104. Dialogue manager 120 may parse the "check balance" message, identify the operation associated with the message, execute the message, and reply to the original "check balance" message with a current balance of the user's 101 account. For example, dialogue manager 120 may transmit an SMS message to client device 102 that recites "Current balance is $1000.00." User 101 may access the reply message via SMS client 116.

Webpage identifier 208 may be configured to identify a current page of application 108 that user is currently viewing. Identifying a current page of application 108 aids in correctly mapping the one or more visual cues performed by user 101 to one or more input commands. For example, a first visual cue may correspond to a first input command on a first page of application 108. However, the first visual cue may correspond to a second input command on a second page of application 108. Thus, webpage identifier 208 aids in correctly identifying a context of the one or more visual cues.

Mapping agent 206 may be configured to map the identified one or more gestures and/or one or more words to an input for application 108. Mapping agent 206 may communicate with database 210 to determine the input corresponding to the one or more gestures and/or one or more words of user 101.

Database 210 includes one or more accounts 212 and one or more default gestures 214. Default input commands 214 are those input commands which are pre-set by management entity 214. For example, default input commands 214 may include one or more default gestures or one or more phrases that correspond to a certain input command or operation to be performed in application 108. Each account 212 may include account information corresponding to a given user 101. For example, account 212 may include custom input commands 216. Custom input commands 216 may be defined by user 101. For example, user 101 may be able to train input identifier 112 to associate one or more gestures or one or more words with a given input. A given custom input command 216 generated by user 101 may supersede a default input command 214 directed to the same input.

Referring back to mapping agent 206, mapping agent 206 may map the identified one or more gestures or one or more words to an input for application 108 based on custom input commands 216 and default input commands 214. Still further, mapping agent 206 may map the identified one or more visual cues based on a current page of application 108. For example, mapping agent 206 may query custom input commands 216 of user's account 212 to determine if a custom input command exists for the one or more visual cues. If a custom input command 216 does not exist for the one or more visual cues, mapping agent 206 may query default input commands 214 to map the one or more visual cues to a default input command.

Figure 3A:
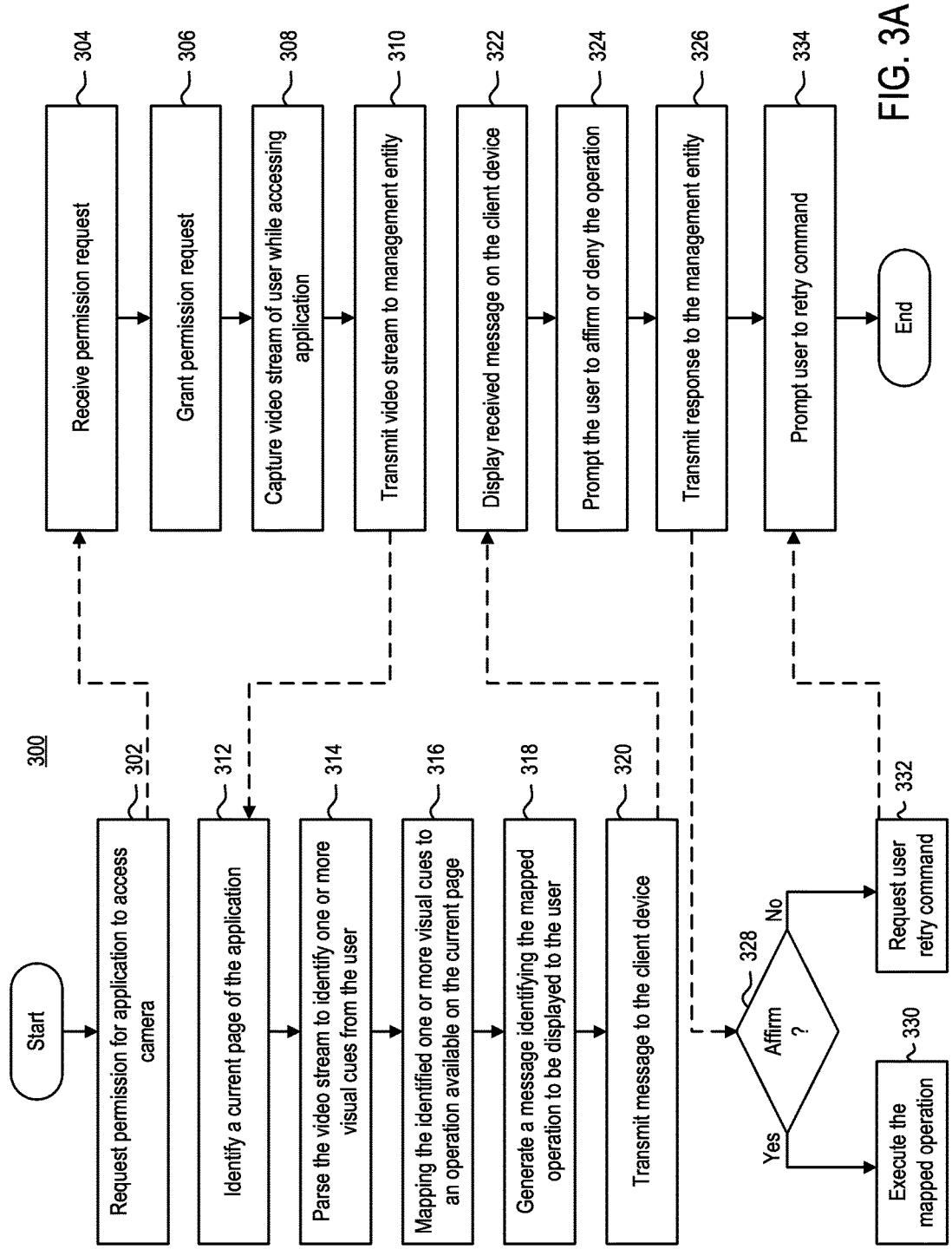
FIG. 3A is a flow diagram illustrating a method of executing a computer operation via facial recognition, according to one embodiment.

FIG. 3A is a flow diagram of a method 300 of executing an operation based on one or more visual cues of a user, according to one embodiment. For example, method 300 illustrates an example of client device 102 capturing one or more visual cues of user 101 while user 101 operates application 108, and management entity 104 mapping the one or more visual cues to an operation available on application 108.

Method 300 begins at step 302. At step 302, management entity 104 requests permission from client device 102 to access camera 106. For example, management entity 104 may generate a message to be transmitted to client device 102 to prompt user 101 to grant or deny access to camera 106 to management entity 104. At step 304, client device 102 receives the request from management entity 104. In some embodiments, client device 102 may display a request message generated by management entity 104 in the form of a push notification. At step 306, client device 102 grants a permission of the request to management entity 104 based on user 101 input. In some embodiments, in lieu of steps 302, 304, client device 102 a camera communicating with client device 102 may be initiated via one or more inputs (either manual or audible). For example, application 108 may be preconfigured with a button or other input that enables user 101 to activate camera. In other embodiments, in lieu of steps 302, 304, camera of client device 102 is activated responsive to launch of application 108.

At step 308, client device 102 captures one or more data streams of user 101 while user 101 operates application 108. For example, camera 106 of client device 102 may capture one or more video streams of user 101. Camera 106 is configured to capture one or more visual cues of user 101 during operation. The one or more visual cues may correspond to an input or input command on a current page of application 108.

At step 310, client device 102 transmits the one or more data streams of user 101 to management entity 104. At step 312, input identifier 112 of management entity 104 identifies a current page of application 108. Webpage identifier 208 may identify the current page by identifying the current content being displayed to user 101. Webpage identifier 208 may identify the current page of application 108 that user 101 was viewing while performing one or more gestures. In embodiments in which application 108 is a browser-based application, webpage identifier 108 may parse a uniform resource locator (URL) in a last received web page request from client device 102. In embodiments in which application 108 is a mobile application, webpage identifier 108 may parse a uniform resource identifier (URI) in a last received request from client device 102.

At step 314, input identifier 112 parses the one or more data streams of user 101 to identify the one or more visual cues of user 101. For example, input identifier 112 may parse one or more video streams on a frame by frame basis to identify the visual cues performed by user 101. In some embodiments, the one or more visual cues can include bodily gestures performed by user 101. In some embodiments, the one or more visual cues can include lip movements of user 101 that correspond to one or more words or phrases. Those skilled in the art would readily understand, that the one or more visual cues may include a combination of bodily gestures as well as one or more lip movements.

At step 316, input identifier 112 maps the identified one or more visual cues to an input on the current page of application 108. For example, input identifier 112 may query database 210 to identify the input to which the one or more visual cues correspond. In some embodiments, the one or more visual cues may correspond to an input in a text field displayed on client device 102. In some embodiments, the one or more visual cues may correspond to an operation to be performed on client device 102. In other words, input identifier 112 may act as an intermediary between web client application server 110 and client device 102. For example, input identifier 112 may identify the operations communicated by user 101, and relay those operations to web client application server 110 for processing. In some embodiments, input identifier 112 may identify the operations communicated by user 101 and work in conjunction with web client application server 110 to execute those operations.

In some embodiments, at step 318, input identifier 112 may, optionally, generate a message that identifies the mapped input. For example, input identifier 112 generates a message to be displayed to user 101 on client device 102 such that user 101 can affirm that the mapped input is correct. In some embodiments in which the one or more visual cues correspond to words mouthed by user 101, input identifier 112 may generate messages in real time to be displayed to user 101. In other embodiments, input identifier 112 may generate the message a predetermined time after the one or more visual cues performed by user 101 have ceased.

In some embodiments, at step 320, input identifier 112 may, optionally, transmit a message to client device 102. Client device 102 displays the received message to user 101 (step 322). For example, client device 102 may generate a push notification that includes the received message to prompt the user to affirm or deny the operation (step 324).

At step 326, client device 112 transmits user's 101 response to the prompt to management entity 104. At step 324, management entity 104 determines whether user 101 has affirmed or rejected the mapped input. If user 101 provided an affirmation that mapped input is the correct input, then at step 330, management entity 104 executes the mapped input. For example, if management entity 104 determines that user 101 has affirmed that waving corresponds to logging out of user's account, management entity 104 logs user 101 out of user's account. In another example, if management entity determines that user 101 has affirmed that "100 Main Street" correctly corresponds to the one or more words mouthed by user, management entity 104 will enter "100 Main Street" into a text input field. In some embodiments, input identifier 112 may identify the operations communicated by user 101, and relay those operations to web client application server 110 for processing. In some embodiments, input identifier 112 identify the operations communicated by user 101 and work in conjunction with web client application server 110 to execute those operations.

If, however, at step 328, management entity 104 determines that user 101 has rejected the mapped operation, then at step 332, management entity 104 generates a message to be transmitted to client device 102 requesting that user retry the one or more visual cues. At step 334, client device 102 prompts user 101 to retry the one or more visual cues. Method 300 may repeat from step 308, allowing user 101 to retry the one or more visual cues.

Figure 3B:
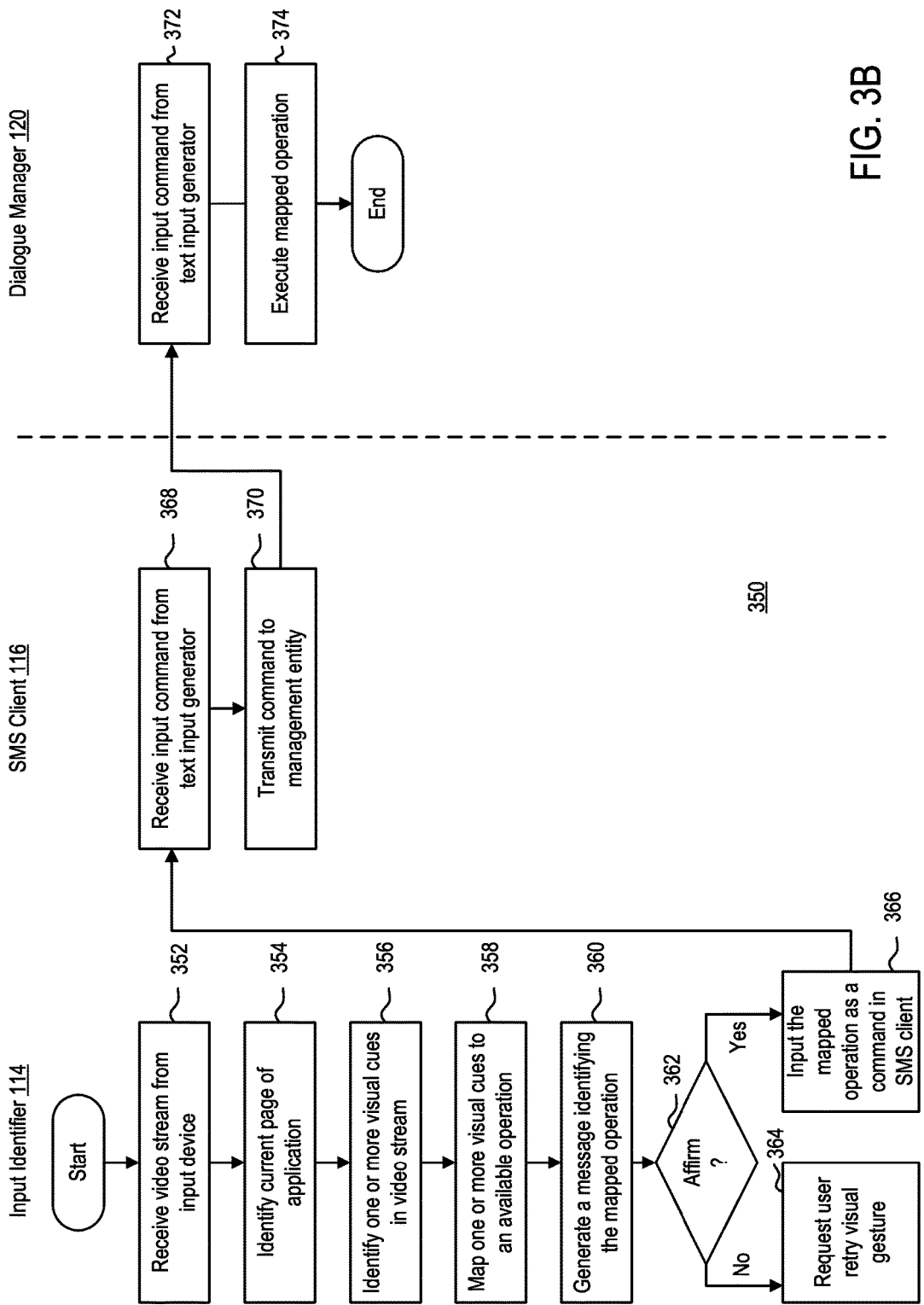
FIG. 3B is a flow diagram illustrating a method of executing a computer operation via facial recognition, according to one embodiment.

FIG. 3B is a flow diagram of a method 350 of executing an operation based on one or more visual cues of a user, according to one embodiment. For example, method 300 illustrates an example of client device 102 capturing one or more visual cues of user 101 while user 101 operates application 108. In the embodiment discussed in conjunction with FIG. 3A, application 108 may include text input identifier 114 as an additional software module, such that one or more functions associated with identifying a visual cue and mapping the visual cue to an available operation may be performed by client device 102. Application 108 may interface with another application (e.g., SMS client 116) executing on client device 102. For example, application 108 may provide the input command to SMS client 116 for further processing.

Method 350 begins at step 352. At step 352, client device 102 captures one or more data streams of user 101 while user 101 operates application 108. For example, camera 106 of client device 102 may capture one or more video streams of user 101. Camera 106 is configured to capture one or more visual cues of user 101 during operation. The one or more visual cues may correspond to an input or input command on a current page of application 108.

At step 354, input identifier 114 of client device 102 identifies a current page of application 108. Webpage identifier 208 may identify the current page by identifying the current content being displayed to user 101. Webpage identifier 208 may identify the current page of application 108 that user 101 was viewing while performing one or more gestures. In embodiments in which application 108 is a browser-based application, webpage identifier 208 may parse a uniform resource locator (URL) in a last received web page request from client device 102. In embodiments in which application 108 is a mobile application, webpage identifier 208 may parse a uniform resource identifier (URI) in a last received request from client device 102.

At step 356, input identifier 112 parses the one or more data streams of user 101 to identify the one or more visual cues of user 101. For example, input identifier 112 may parse one or more video streams on a frame by frame basis to identify the visual cues performed by user 101. In some embodiments, the one or more visual cues can include bodily gestures performed by user 101. In some embodiments, the one or more visual cues can include lip movements of user 101 that correspond to one or more words or phrases. Those skilled in the art would readily understand that the one or more visual cues may include a combination of bodily gestures as well as one or more lip movements.

At step 358, input identifier 112 maps the identified one or more visual cues to an input on the current page of application 108. For example, input identifier 112 may query database 210 to identify the input to which the one or more visual cues correspond. In some embodiments, the one or more visual cues may correspond to an input in a text field displayed on client device 102. In some embodiments, the one or more visual cues may correspond to an operation to be performed on client device 102.

In some embodiments, at step 360, input identifier 112 may, optionally, generate a message that identifies the mapped input. For example, input identifier 112 generates a message to be displayed to user 101 on client device 102 such that user 101 can affirm (step 362) that the mapped input is correct. In some embodiments in which the one or more visual cues correspond to words mouthed by user 101, input identifier 112 may generate messages in real time to be displayed to user 101. In other embodiments, input identifier 112 may generate the message a predetermined time after the one or more visual cues performed by user 101 have ceased.

If, at step 362, user 101 provided an affirmation that mapped input is the correct input, then at step 366, text input identifier 114 inputs the mapped operation as a command in SMS client 116. For example, if text input identifier determines that user 101 has affirmed that waving corresponds to logging out of user's account, input identifier 114 generates an input command to log out of user's account, and transmits that message to SMS client 116. In another example, if input identifier 114 determines that user 101 has affirmed that "100 Main Street" correctly corresponds to the one or more words mouthed by user, input identifier 114 will generate a message including "100 Main Street" and transmit that message to SMS client 116.

If, however, at step 362, input identifier 114 determines that user 101 has rejected the mapped operation, then at step 364, input identifier 114 generates a message to be transmitted to be displayed, via client device 102, requesting that user retry the one or more visual cues.

At step 368, SMS client 116 receives input command from input identifier 114. SMS client 116 may then transmit the command to management entity 104 (step 370). For example, SMS client may transmit the command to dialogue manager 120 hosted on management entity 104.

At step 372, management entity 104 receives the input command from input identifier. For example, dialogue manager 120 may receive a text-based request from SMS client 116 on client device 102.

At step 374, management entity 104 may execute the input command in the text-based request. For example, dialogue manager 120 may parse the text-based request for one or more commands contained therein. Dialogue manager 120 may map the one or more commands to the one or more available commands to the user. Dialogue manager 120 may then process the one or more commands. For example, in response to receiving a message including the command "Check balance", dialogue manager 120 may check user's 101 balance, and subsequently generate a reply message with user's 101 balance contained therein.

FIG. 4 is a flow diagram illustrating step 314 of method 300 in more detail, according to an example embodiment. FIG. 4 illustrates only one example of how input identifier 112 identifies one or more visual cues of user 101. Although FIG. 4 discusses the processes with respect to input identifier 112, those skilled in the art could readily understand that the operations described below may be performed by input identifier 114, or a combination of input identifier 112 and input identifier 114.

At step 402, lip reading agent 204 receives the one or more streams of data from camera 106. For example, lip reading agent 204 may receive a plurality of frames of video captured by camera 106. In some embodiments, lip reading agent 204 receives the one or more streams of data in real-time (or near real-time) from camera 106. In some embodiments, lip reading agent 204 receives the one or more streams of data on a delay.

At step 404, lip reading agent 204 parses the one or more streams of data from camera 106. For example, lip reading agent 204 may parse the plurality of frames of video captured by the user to track lip movements of the user over time. In some embodiments, lip reading agent 204 may position one or more plot points on one or more interest points of user's lips to evaluate the lip movements.

At step 406, lip reading agent 204 maps one or more lip movements to one or more words or phrases. For example, after lip reading agent 204 tracks lip movements of user 101, lip reading agent 204 then compares the identified lip movements to one or more words or phrases. The one or more words or phrases mouthed by user 101 may subsequently be used by mapping agent 206 to identify one or more inputs to which the one or more words or phrases correspond.

FIG. 5 is a flow diagram illustrating step 314 of method 300 in more detail, according to an example embodiment. FIG. 5 illustrates only one example of how input identifier 112 identifies one or more visual cues of user 101. Although FIG. 5 discusses the processes with respect to input identifier 112, those skilled in the art could readily understand that the operations described below may be performed by input identifier 114, or a combination of input identifier 112 and input identifier 114.

At step 502, gesture identifier 202 receives the one or more streams of data from camera 106. For example, gesture identifier 202 may receive a plurality of frames of video captured by camera 106. In some embodiments, gesture identifier 202 receives the one or more streams of data in real-time (or near real-time) from camera 106. In some embodiments, gesture identifier 202 receives the one or more streams of data on a delay.

At step 504, gesture identifier 202 parses the one or more streams of data from camera 106. Gesture identifier 202 may parse the plurality of frames of video captured by the user to identify one or more visual cues by the user. For example, gesture identifier 202 may parse the plurality of frames of video captured by the user to identify one or more bodily movements of the user over time. In some embodiments, gesture identifier 202 may track one or more hand gestures performed by user 101 over time. In some embodiments, gesture identifier 202 may track one or more facial gestures performed by user 101 over time. In other embodiments, gesture identifier 202 may track a combination of facial gestures and hand gestures performed by user 101. Those skilled in the art would readily understand that gestures are not limited to the face or hands of the user. Generally, gesture identifier 202 may track any bodily movement by user 101. In some embodiments, gesture identifier 202 may position one or more plot points on one or more interest points on user's body in the line of sight of camera 106 to evaluate one or more bodily movements.

At step 506, gesture identifier 202 maps one or more body movements of user 101 to one or more gestures. For example, after gesture identifier 202 tracks body movements of user 101, gesture identifier 202 then compares the identified body movements (i.e., visual cues) to one or more gestures. The one or more gestures mouthed by user 101 may subsequently be used by mapping agent 206 to identify one or more inputs to which the one or more gestures correspond.

Figure 6:
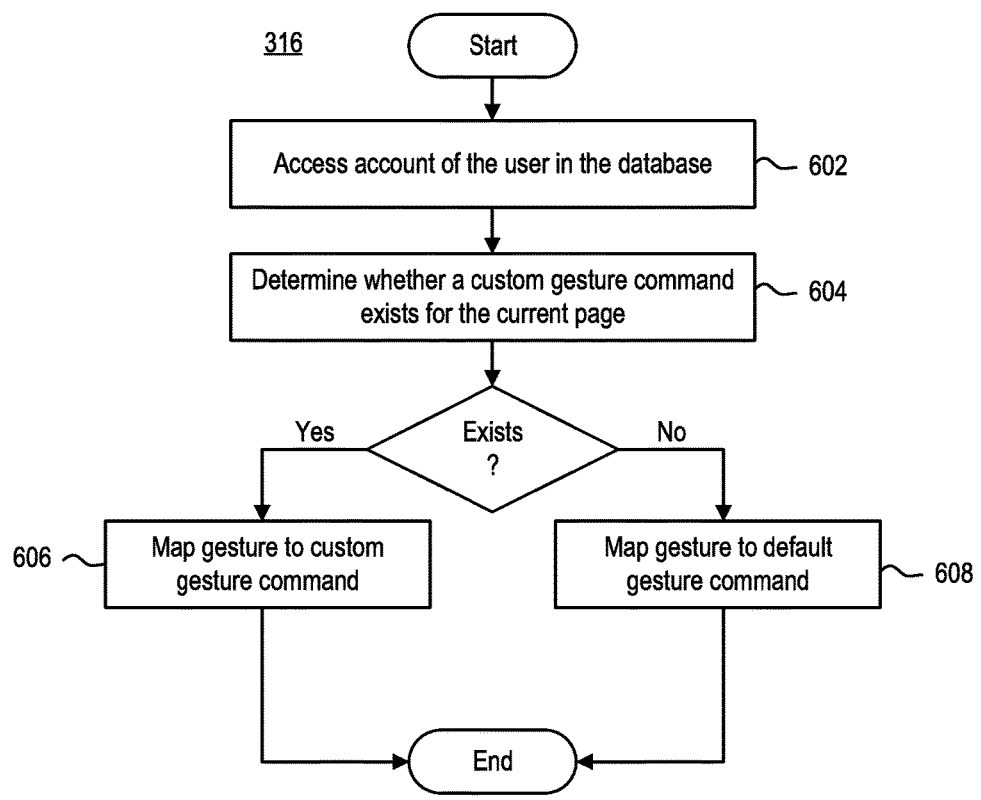
FIG. 6 is a flow diagram illustrating a step of the method of FIG. 3 in more detail, according to one embodiment.

FIG. 6 is a flow diagram illustrating step 316 of method 300 in more detail, according to an example embodiment. Step 316 is initiated after input identifier 112 parses the video or image stream to identify one or more visual cues from the user. Step 316 involves input identifier mapping the identified one or more visual cues to an input available on the current page.

At step 602, mapping agent 206 accesses an account 212 corresponding to user 101 in database 210. As recited above, account 212 of user 101 may include one or more custom input commands 216. One or more custom input commands 216 are one or more input commands predefined by user 101. In some embodiments, one or more custom input commands 216 may be stored locally on client device 102. As such, in these embodiments, mapping agent 206 may request access to local storage of client device 102 to retrieve one or more custom input commands.

At step 604, mapping agent 206 determines whether a custom gesture command exists for a current page of application 108. For example, mapping agent 206 may query database to identify one or more inputs to which the one or more visual cues map. In some embodiments, the query may return both a custom input command and a default input command. In some embodiments, the query may return a custom input command. In other embodiments, the query may return a default input command.

If at step 604, mapping agent 206 determines that a custom input command exists to which the one or more visual cues map, at step 606 mapping agent 206 maps the one or more visual cues to the custom gesture command. For example, in the situation where query returns both a custom input command and a default input command, the custom input command may supersede the default input command. Thus, mapping agent 206 maps the one or more visual cues to the custom gesture command.

If, however, at step 604, mapping agent 206 determines that a custom input command does not exist, at step 608, mapping agent 206 maps the one or more visual cues to the default gesture command, should one exist. For example, mapping agent 206 maps the one or more visual cues to the default input command returned by the query.

Figure 7A:
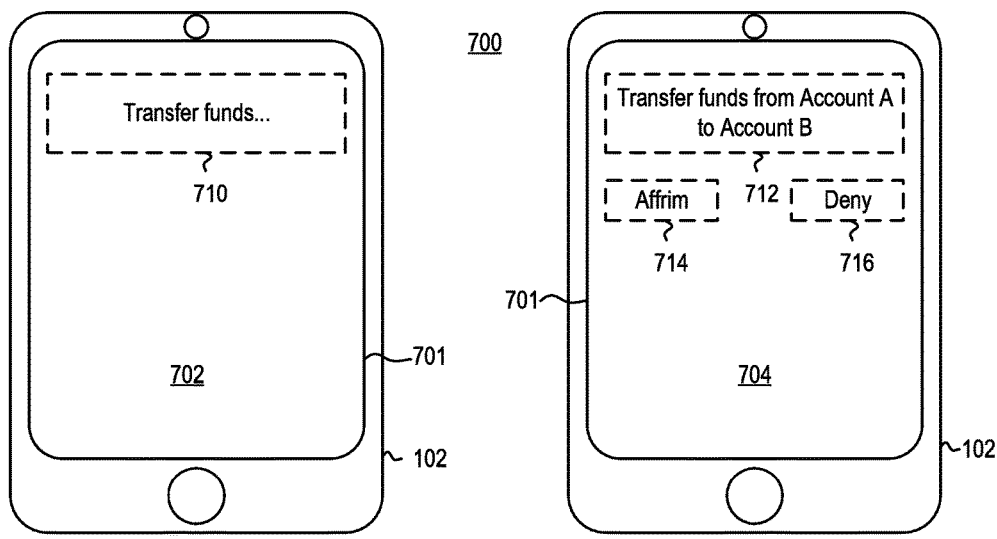
FIG. 7A is a block diagram illustrating screenshots of graphical user interfaces (GUIs) of a client device, according to one embodiment.

FIG. 7A is a block diagram 700 illustrating of client device 102, according to an example embodiment. Client device 102 includes screen 701. Block diagram 700 illustrates screenshot 702 and screenshot 704, at a time subsequent to screenshot 702. Screenshots 702 and 704 depict a verification message to be generated for user 101 to verify whether mapping agent 206 correctly mapped one or more visual cues to one or more input commands.

As discussed above, after input identifier 112 maps the one or more visual cues to one or more inputs commands, input identifier 112 may generate a verification message to be transmitted to client device 102. Client device 702 includes a screen 701 on which client device 702 may display the received verification message. Screenshot 702 includes verification message 710. Verification message 710 may be a partial message that is displayed for user 101. For example, the one or more visual cues identified by input identifier 112 may be in the form of words mouthed by user 101. Accordingly, input identifier 112 may transfer a message including the words mouthed by user in real-time, such that client device 102 may display one or more words spoken by user 101 on the screen in real-time (or near real-time). In this example, message 710 includes the partial message "Transfer funds . . . ."

Screenshot 704 includes verification message 712. Verification message 712 may be a complete message that is displayed for user 101. For example, the one or more visual cues identified by input identifier 112 may be in the form of words mouthed by user 101. In this example, message 712 includes the complete message that was started in message 710. For example, message 712 recites "Transfer funds from Account A to Account B." Client device 102 may further prompt user 101 to affirm or deny that message 712 is correct. For example, client device 102 may prompt user by pushing to user 101 an affirm option 714 and a deny option 716, each option actionable by user 101 (based on a manual input or a visual cue as described herein). Accordingly, user 101 may select one of affirm option 714 and deny option 716, in response to reviewing verification message 712.

Figure 7B:
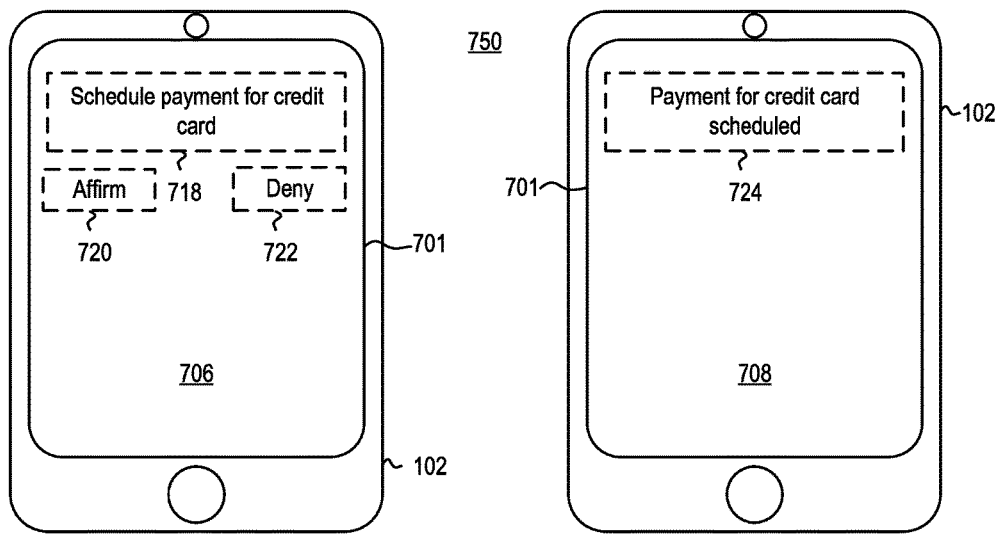
FIG. 7B is a block diagram illustrating screenshots of GUIs of a client device, according to one embodiment.

FIG. 7B is a block diagram 750 illustrating client device 102, according to an example embodiment. Client device 102 includes screen 701. Block diagram 750 illustrates screenshot 706 and screenshot 708, at a time subsequent to screenshot 706. Screenshots 706 and 708 depict a verification message to be generated for user 101 to verify whether mapping agent 206 correctly mapped one or more visual cues to one or more input commands.

As discussed above, after input identifier 112 maps the one or more visual cues to one or more inputs commands, input identifier 112 may generate a verification message to be transmitted to client device 102. Client device 702 includes a screen 701 on which client device 102 may display the received verification message. Screenshot 706 includes verification message 718. Verification message 718 may be a complete message that is displayed for user 101. For example, the one or more visual cues identified by input identifier 112 may be in the form of a gesture performed by user 101. Accordingly, input identifier 112 may transfer a message with an input command that corresponds to the gesture performed by the user. In this example, message 718 recites "Schedule payment for credit card." Similar to the example discussed above, client device 102 may further prompt user 101 to affirm or deny that message 718 is correct. For example, client device 102 may prompt user by pushing to user 101 an affirm option 720 and a deny option 722 each option actionable by user 101 (based on a manual input or a visual cue as described herein). Accordingly, user 101 may select one of affirm option 720 and deny option 722, in response to reviewing verification message 718.

Screenshot 708 includes message 724. Message 724 may be generated in response to user selecting affirm option 720. Message 724 notifies user 101 that management entity 104 executed the mapped input command. Accordingly, message 724 recites "Payment for credit card scheduled."

FIG. 8 is a block diagram illustrating a computing environment 800, according to one embodiment. Computing environment 800 includes computing system 802 and computing system 852 communicating over network 805. Computing system 802 may be representative of management entity 104. Computing system 852 may be representative of client device 102.

Computing system 802 may include a processor 804, a memory 806, a storage 808, and a network interface 810. In some embodiments, computing system 800 may be coupled to one or more I/O device(s) 812. In some embodiments, computing system 800 may be in communication with database 210.

Processor 804 retrieves and executes program code 816 (i.e., programming instructions) stored in memory 806, as well as stores and retrieves application data. Processor 804 is included to be representative of a single processor, multiple processors, a single processor having multiple processing cores, and the like. Network interface 810 may be any type of network communications allowing computing system 802 to communicate externally via computing network 805. For example, network interface 810 allows computing system 800 to communicate with computer system 852.

Storage 808 may be, for example, a disk storage device. Although shown as a single unit, storage 808 may be a combination of fixed and/or removable storage devices, such as fixed disk drives, removable memory cards, optical storage, network attached storage (SAN), storage area network (SAN), and the like.

In some embodiments, memory 806 may include website 812, operating system 814, program code 816, and input identifier 112. Program code 816 may be accessed by processor 804 for processing (i.e., executing program instructions). Program code 816 may include, for example, code or instructions for executing the steps discussed above in conjunction with FIGS. 3-6. In a specific example, processor 804 may access program code 816 for executing an operation based on one or more visual cues of a user. In some embodiments, program code 816 may be developed using machine-learning technology. For example, program code 816 may be developed from a training set that was developed using a training algorithm. Website 812 may be accessed by computing system 852. For example, website 812 may include content accessed or requested by computing system 852 via a web browser or application of computing system 852. Input identifier 112 is configured to identify one or more visual cues performed by a user of computing system 852 during operation of an application that accesses website 812. Input identifier 112 may then map the identified one or more visual cues to an input currently available on application. In some embodiments, input identifier 112 may generate a message to be transmitted to computing system 852 to verify the input to which input identifier 112 mapped the one or more visual cues. In some embodiments, computing system 802 may further include dialogue manager 120. Dialogue manager 120 may be configured to parse commands received from computing system 852 for execution.

In some embodiments, computing system 852 may include a processor 854, a memory 856, a storage 858, and a network interface 860. In some embodiments, computing system 852 may be coupled to one or more I/O device(s) 862.

In some embodiments, processor 854 retrieves and executes program code 866 (i.e., programming instructions) stored in memory 856, as well as stores and retrieves application data. Processor 854 is included to be representative of a single processor, multiple processors, a single processor having multiple processing cores, and the like. Network interface 860 may be any type of network communications allowing computing system 852 to communicate externally via computing network 805. For example, network interface 860 allows external communication with computing system 802.

In some embodiments, storage 808 may be, for example, a disk storage device. Although shown as a single unit, storage 808 may be a combination of fixed and/or removable storage devices, such as fixed disk drives, removable memory cards, optical storage, network attached storage (SAN), storage area network (SAN), and the like.

In some embodiments, I/O devices 872 may be in communication with computing system 852. I/O devices 872 may include one or more data recorders camera(s) 870. In some embodiments, one or more cameras 870 may include one or more front-facing cameras. In some embodiments, one or more cameras 870 may include one or more rear-facing cameras. In other embodiments, one or more cameras 870 may include a combination of one or more front-facing cameras and one or more rear-facing cameras.

In some embodiments, memory 856 may include application 108, operating system 864, and program code 866. Program code 866 may be accessed by processor 854 for processing (i.e., executing program instructions). Program code 866 may include, for example, gathering one or more data streams, as well as prompting a user for verification. Application 108 allows a user of computing system 852 to access a functionality of management entity 802. For example, application 108 may access content managed by computing system 802, such as website 812. The content that is displayed to a user of computing system 852 may be transmitted from computing system 802 to computing system 852, and subsequently processed by application 108 for display through a graphical user interface (GUI) of computing system 852

In the embodiments in which a client device 102 includes the elements or functionality of input identifier 112, computing system 852 includes input identifier 114 and SMS client 116, which may operate substantially similar to input identifier 112 on computing system 802. In some embodiments, input identifier 114 may supersede a need for computing system 802 to include input identifier 112. In some embodiments, input identifier 114 may work in conjunction with input identifier 112 for executing an operation based on one or more visual cues of a user. In operation, input identifier 114 may identify one or more visual cues performed by the user, transcribe the one or more visual cues into a command, input the command as a text message to SMS client 116, and transmit the command as the text message to dialogue management device 120 on management entity 104 for further processing.

While the foregoing is directed to embodiment described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
    receiving, from a client device, at a management computing system remote from the client device, a request for a web page of a website hosted by a web server of the management computing system, the request received via an application executing on the client device;
    transmitting, to the client device, the web page associated with the request;
    requesting, by the management computing system from the client device, permission for the application executing on the client device to access a camera associated with the client device;
    receiving, from the client device, permission for the application to access the camera while a user of the client device operates the application executing on the client device;
    receiving, from a camera associated with the client device, at the management computing system, a video stream of a user interacting with the web page of the website via the application executing on the client device, the video stream comprising a time series of images of the user;
    parsing, by the management computing system, the video stream to identify one or more visual cues of the user;
    identifying a current page of the website accessed by the user via the application by parsing a uniform resource locator associated with the request for the web page;
    mapping the identified one or more visual cues to an operation available on the current page of the website; and
    executing the mapped operation.

2. The method of claim 1, wherein parsing the video stream to identify one or more visual cues of the user, comprises:
    identifying lip movement of the user over the time series of images to identify one or more words mouthed by the user.

3. The method of claim 1, wherein parsing the video stream to identify one or more visual cues of the user, comprises:
 determining one or more gestures of the user performed by the user over the time series of images.

4. The method of claim 1, wherein mapping the identified one or more visual cues to an operation available on the current page of the website, comprises:
 referencing a database storing predefined visual cues linked to operations of the website.

5. The method of claim 4, wherein the predefined visual cues are user specific.

6. The method of claim 1, wherein the one or more visual cues of the user maps to the operation while accessing the current page of the website, and wherein the one or more visual cues of the user maps to a second operation while accessing a second page of the website.

7. The method of claim 1, wherein mapping the identified one or more visual cues to an operation available on the current page of the website, comprises:
 mapping the identified, one or more visual cues to an authentication operation that grants the user access to a profile of the user on the website.

8. A system, comprising:
 a processor; and
 memory storing program code, which, when executed by the processor, performs an operation, comprising:
  receiving, from a remote client device, a request for a web page of a website hosted by a web server of the system, the request received via an application executing on the client device;
  transmitting, to the client device, the web page associated with the request;
  requesting, from the client device, permission for the application executing on the client device to access a camera associated with the client device;
  receiving, from the client device, permission for the application to access the camera while a user of the client device operates the application executing on the client device;
  receiving, from the client device, a video stream of a user accessing the web page hosted by the web server via the application executing on the client device;
  parsing a time series of images in the video stream to identify a command visually communicated by the user;
  identifying a current page of the website accessed by the user via the application by parsing a uniform resource identifier associated with the request for the web page;
  mapping the identified visual command of the user to an operation available on the current page of the website; and
  executing the mapped operation.

9. The system of claim 8, wherein parsing the time series of images in the video stream to identify a command visually communicated by the user, comprises:
 identifying one or more visual cues performed by the user.

10. The system of claim 9, wherein the one or more visual cues of the user maps to the operation while accessing the current page of the website, and wherein the one or more visual cues of the user maps to a second operation while accessing a second page of the website.

11. The system of claim 8, wherein parsing the time series of images in the video stream to identify a command visually communicated by the user, comprises:
 determining a lip movement of the user to identify one or more words mouthed by the user.

12. The system of claim 8, wherein parsing the time series of images in the video stream to identify a command visually communicated by the user, comprises:
 determining one or more gestures performed by the user.

13. The system of claim 8, wherein mapping the identified visual command to an operation available on the current page of the website, comprising:
 referencing a database storing predefined visual cues linked to operations of the application.

14. The system of claim 13, wherein the predefined visual cues are user specific.

15. The system of claim 8, wherein mapping the identified visual command to an operation available on the current page of the website, comprises:
 mapping the identified visual command to an authentication operation that grants the user access to a profile of the user on the application.

16. The system of claim 8, wherein the operation is developed from a training data set that was developed using a training algorithm.

17. A method, comprising:
 requesting, by a client device, a web page of a website hosted by a remote server, the request sent via an application executing on the client device;
 receiving, by the client device from the remote server, the web page associated with the request;
 receiving, by the client device from the remote server, a request for the application executing on the client device to access a camera associated with the client device;
 granting, by the client device to the application, access to the camera associated with the client device while a user of the client device is operating the application executing on the client device;
 capturing, by the camera associated with the client device, a video stream of a user while the user is operating the application on the client device;
 parsing, by the client device, the video stream to identify one or more visual cues to identify a command visually communicated by the user;
 mapping, by the client device, the one or more visual cues performed by the user to one or more stored commands;
 sending, by the client device, the mapped command to the remote server to identify an operation the stored command maps to on a current page of the website by identifying a uniform resource locator associated with the request for the web page;
 receiving, by the client device, the operation from the remote server; and
 updating, by the client device, an interface of the client device to prompt the user with a text-based description of the operation.

18. The method of claim 17, further comprising:
 determining that the user has rejected the text-based description of the operation; and
 prompting the user to capture a further video stream of the user while operating the application.

19. The method of claim 17, further comprising:
 determining that the user has affirmed the text-based description of the operation; and
 notifying the remote server that the user has affirmed the operation.

20. The method of claim 17, wherein parsing the video stream to identify one or more visual cues to identify a command visually communicated by the user, comprises:
   identifying one or more lip movements of the user.

* * * * *